(No Model.)
W. BUTTERFIELD.
SELF BINDING HARVESTER.
No. 494,321. Patented Mar. 28, 1893.
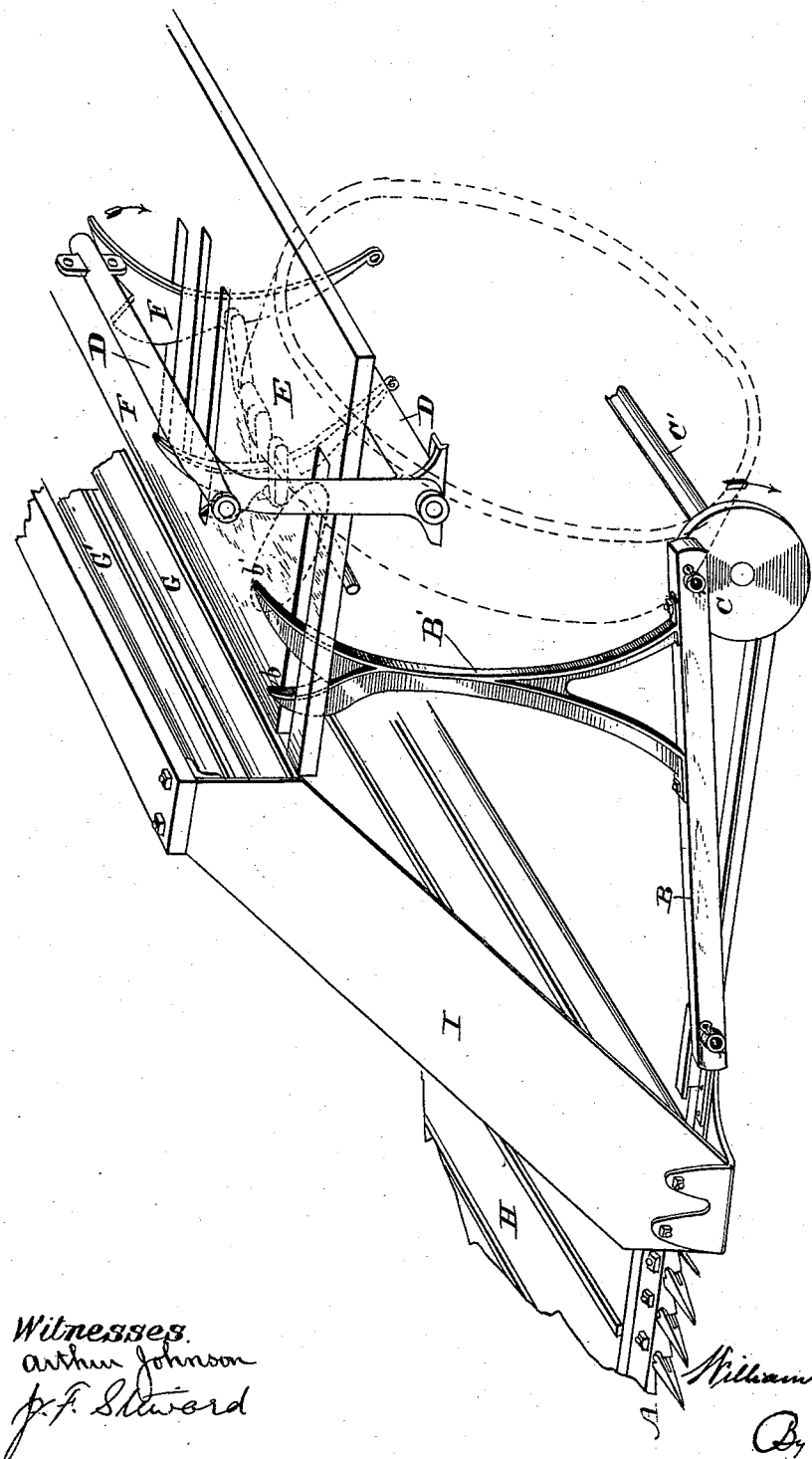
Witnesses.
Arthur Johnson
J. F. Steward
Inventor.
William Butterfield
By Phil. T. Dodge
Atty.

UNITED STATES PATENT OFFICE.

WILLIAM BUTTERFIELD, OF CHICAGO, ILLINOIS.

SELF-BINDING HARVESTER.

SPECIFICATION forming part of Letters Patent No. 494,321, dated March 28, 1893.

Application filed June 13, 1891. Serial No. 396,110. (No model.)

*To all whom it may concern:*

Be it known that I, WILLIAM BUTTERFIELD, of Chicago, in the county of Cook and State of Illinois, have invented certain new and useful Improvement in Self-Binding Harvesters, of which the following is a full description, reference being had to the accompanying drawing.

The object of my invention is to provide a more efficient delivery of the butts of the straws of the grain as they are being operated upon between the time the straws are set free from the elevating devices and the bundle thrown to the ground, and its nature consists in mounting a butt-moving device upon the pitman which moves the sickle, in such a way that it may be carried thereby and serve to force the butts of the straws in the direction of discharge.

In the drawing are shown but those portions of a self-binding harvester which are essential to a proper understanding of my invention. The main wheel is shown in dotted lines. The frame work of the machine may be mounted thereon in any suitable way.

A, is so much of the cutting apparatus as necessary to here show, reciprocated by the pitman B, which is thrown by a crank wrist on the wheel C, the shaft C' of which may be operated as similar parts are now operated on machines in common use.

D, is the binder frame; E, the binder table, and F, the packers of an ordinary self-binder. These may be thrown by the cranks, shown in dotted lines as located beneath the table, or otherwise.

G, and G' are the elevating canvases, and H, the platform conveyer. The packers are given a feeding movement in the direction of the arrows, and the crank wheel given a corresponding direction, as also indicated.

Upon the pitman B, is bolted the upreaching conveying device B', comprising a vertical arm or standard having at its upper end one or more aggressive points, *b'*, which in operation, are projected upward into the butts of the grain that is being operated upon. As the pitman is thrown through its movement, to reciprocate the sickle, the points *b* and *b'*, above the table are given an orbital motion similar to that shown in dotted lines as representing the path of *b'*.

In operating in grain, the butts of the straws are held from moving in the direction of delivery as fast as the heads by brushing contact with the standing grain being advanced upon, and are hence placed in a diagonal position across the platform conveyer. This diagonal position remains uncorrected until after the grain is delivered by the elevating devices, and after such delivery the butts often lag behind, and, even when the bundle is formed the butt thereof is likely to remain in its retarded position relative to the heads. With my arrangement the grain is forced forward, and should there be a tendency for the butts of the straws, or butt of the bundle, to remain in a less advanced position, the conveying device upon the pitman carries them onward.

What I claim as my invention, and desire to secure by Letters Patent, is—

1. The combination with the binder-table, and the binding mechanism thereon, of the pitman and the vertical arm thereon operating above the binder-table to advance the butts of the grain thereon.

2. The combination with the binder-table, the binding mechanism thereon, the packers, and the conveyers for delivering the grain to the binder-table, of the pitman, the crankshaft for driving the same with a rising and falling movement, the vertical arm or standard operating above the binder table to advance the grain thereon.

3. In a grain binding machine, the combination of the frame, the grain platform, the cutting mechanism at its front the inclined elevator aprons, the binding table projecting laterally from the delivery ends of the elevator aprons, the binding mechanism, the crank shaft sustained by the frame below the binding table, the pitman extending longitudinally of the cutting mechanism and connected respectively at its ends to the crank shaft and the cutting mechanism, and the upright arm carried by the pitman and having its upper end arranged to act adjacent to the binding table on the butts of the grain to advance the same.

WILLIAM BUTTERFIELD.

Witnesses:
ARTHUR JOHNSON,
A. L. UPTON.